(12) United States Patent
Kothari et al.

(10) Patent No.: US 10,909,138 B2
(45) Date of Patent: Feb. 2, 2021

(54) TRANSFORMING DATA TO SHARE ACROSS APPLICATIONS

(71) Applicant: Microsoft Technology Licensing, LLC, Redmond, WA (US)

(72) Inventors: Ashish Kothari, Hyderabad (IN); Adithya Nittor Vishwanath, Hyderabad (IN); Shaleen Sharma, Uttar Pradesh (IN); Ramprasadh Kothandaraman, Telengana (IN); Sutirtha Saha, Hyderabad (IN); Ashwinderjit Kaur, Punjab (IN); Rajarshi Ray, Kolkata (IN); Eric Fernandes, Hyderabad (IN); Mahesh Hariharan, Hyderabad (IN); Abhishek Agarwal, Hyderabad (IN); Kritika Kishore Prasad, Hyderabad (IN); Anirban Saha, West Bengal (IN); Gaurav Agrawal, Hyderabad (IN); Prateek Rajvanshi, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 838 days.

(21) Appl. No.: 14/643,111

(22) Filed: Mar. 10, 2015

(65) Prior Publication Data
US 2016/0267156 A1      Sep. 15, 2016

(51) Int. Cl.
*G06F 16/25* (2019.01)
*G06F 16/951* (2019.01)

(52) U.S. Cl.
CPC .......... *G06F 16/258* (2019.01); *G06F 16/951* (2019.01)

(58) Field of Classification Search
CPC .... G06F 16/951; G06F 9/3017; G06F 12/063; G06F 12/0873; G06F 16/258; G06F 17/30
See application file for complete search history.

(56) References Cited

U.S. PATENT DOCUMENTS 6,965,886 B2    11/2005   Govrin et al.
7,363,406 B2 *   4/2008   Chai ................. G06F 13/161
                                                     710/244

(Continued)

OTHER PUBLICATIONS

J. Barry et al., "NIIIp-SMART: an investigation of distributed object approaches to support MES development and deployment in a virtual enterprise," Proceedings Second International Enterprise Distributed Object Computing (Cat. No. 98EX244), La Jolla, CA, USA, 1998, pp. 366-377, doi: 10.1109/EDOC.1998.723271.*

(Continued)

*Primary Examiner* — Pierre Miche Bataille
(74) *Attorney, Agent, or Firm* — Christopher R. Christenson; Kelly, Holt & Christenson PLLC

(57) ABSTRACT

A qualifying system receives a channel activity record from one of a plurality of different external systems, over one of a plurality of different communication channels. It accesses qualification rules to determine whether the channel activity record is to be transformed into one or more target entities in a computing system. If so, a conversion engine accesses user-configurable mappings and conversion rules to identify conversion actions that are to be taken in order to transform the channel activity record into one or more target entities. The conversion engine performs a data transformation on the channel activity record to transform it into the identified one or more target entities.

19 Claims, 10 Drawing Sheets

(56) References Cited

U.S. PATENT DOCUMENTS

| | | | |
|---|---|---|---|
| 7,870,012 B2 | 1/2011 | Katz et al. | |
| 8,583,707 B2* | 11/2013 | Matsumura | G06F 16/258 707/809 |
| 2003/0069780 A1 | 4/2003 | Hailwood et al. | |
| 2003/0212654 A1 | 11/2003 | Harper et al. | |
| 2006/0136489 A1* | 6/2006 | Thome | G06Q 10/10 |
| 2007/0011134 A1 | 1/2007 | Langseth et al. | |
| 2008/0021754 A1 | 1/2008 | Horn et al. | |
| 2010/0306179 A1* | 12/2010 | Lim | G06F 17/3089 707/688 |
| 2011/0219315 A1* | 9/2011 | Bier | G06Q 10/10 715/752 |
| 2011/0307948 A1 | 12/2011 | Ranjan et al. | |
| 2012/0151381 A1* | 6/2012 | Schiff | G06F 3/04817 715/752 |
| 2012/0284312 A1 | 11/2012 | Gore et al. | |
| 2013/0163733 A1* | 6/2013 | Aerrabotu | H04M 11/00 379/93.17 |
| 2013/0204658 A1* | 8/2013 | Yogev | G06Q 30/0201 705/7.29 |
| 2013/0231050 A1* | 9/2013 | Nakagawa | H04W 4/80 455/41.2 |
| 2014/0040182 A1 | 2/2014 | Gilder et al. | |
| 2014/0325607 A1 | 10/2014 | Lewis et al. | |
| 2015/0006612 A1* | 1/2015 | Natoli | G06F 19/322 709/202 |
| 2015/0120650 A1* | 4/2015 | Seay | G06Q 30/01 707/610 |
| 2015/0150023 A1* | 5/2015 | Johnson | G06F 9/5027 718/107 |
| 2016/0070758 A1* | 3/2016 | Thomson | G06F 17/30507 707/781 |
| 2017/0004172 A1* | 1/2017 | Idei | G06F 16/217 |

OTHER PUBLICATIONS

Kim, et al., "Automated Data Warehousin for Rule-based CRM Systems", In Proceedings of the 14th Australasian database conference—vol. 17, Jan. 1, 2003, 7 pages.

Liu, et al., "The Research on System Framework and Application of Analytical CRM based on MAS", In Proceedings of Communications of the IIMA vol. 7, Issue 4, Retrieved on: Dec. 9, 2014, 10 pages.

"Cast Iron for Oracle CRM on Deand", Retrieved on: Dec. 9, 2014, Available at: http://www.intelenex.com/docs/ci_for_oraclecrm.pdf.

\* cited by examiner

TRANSFORMING DATA TO SHARE ACROSS APPLICATIONS

BACKGROUND

Computer systems are currently in wide use. Some such computer systems can be used for receiving information from and sharing information across, a variety of different sources.

By way of example, some computing systems work with multiple different, external applications. The external applications are external to the computing system and may be custom built to interact with the computing system. The external applications may also be acquired by a third party, or be part of a legacy computer system, which preexisted the computing system. The external applications can also include a variety of different combinations of these types of applications.

For example, some organizations are represented by numerous different social presences (or social media applications). They may also be represented with multiple different website applications, and they may also receive information from a variety of different portals. The information can be received from these multiple different sources, for internal use. Information can also be captured by some of these external applications, and used to identify user interactions that are relevant to the organization. These external applications may be hosted in a cloud computing environment, they may be on-premise applications that are physically located on the premises of the organization, among a wide variety of other things.

In some current systems, when an organization wishes to obtain information (at its computing system) from such external applications, information gathering applications were independently developed, when they were needed. A different information gathering application was developed for each different external application.

The discussion above is merely provided for general background information and is not intended to be used as an aid in determining the scope of the claimed subject matter.

SUMMARY

A qualifying system receives a channel activity record from one of a plurality of different external systems, over one of a plurality of different communication channels. It accesses qualification rules to determine whether the channel activity record is to be transformed into one or more target entities in a computing system. If so, a conversion engine accesses user-configurable mappings and conversion rules to identify conversion actions that are to be taken in order to transform the channel activity record into one or more target entities. The conversion engine performs a data transformation on the channel activity record to transform it into the identified one or more target entities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
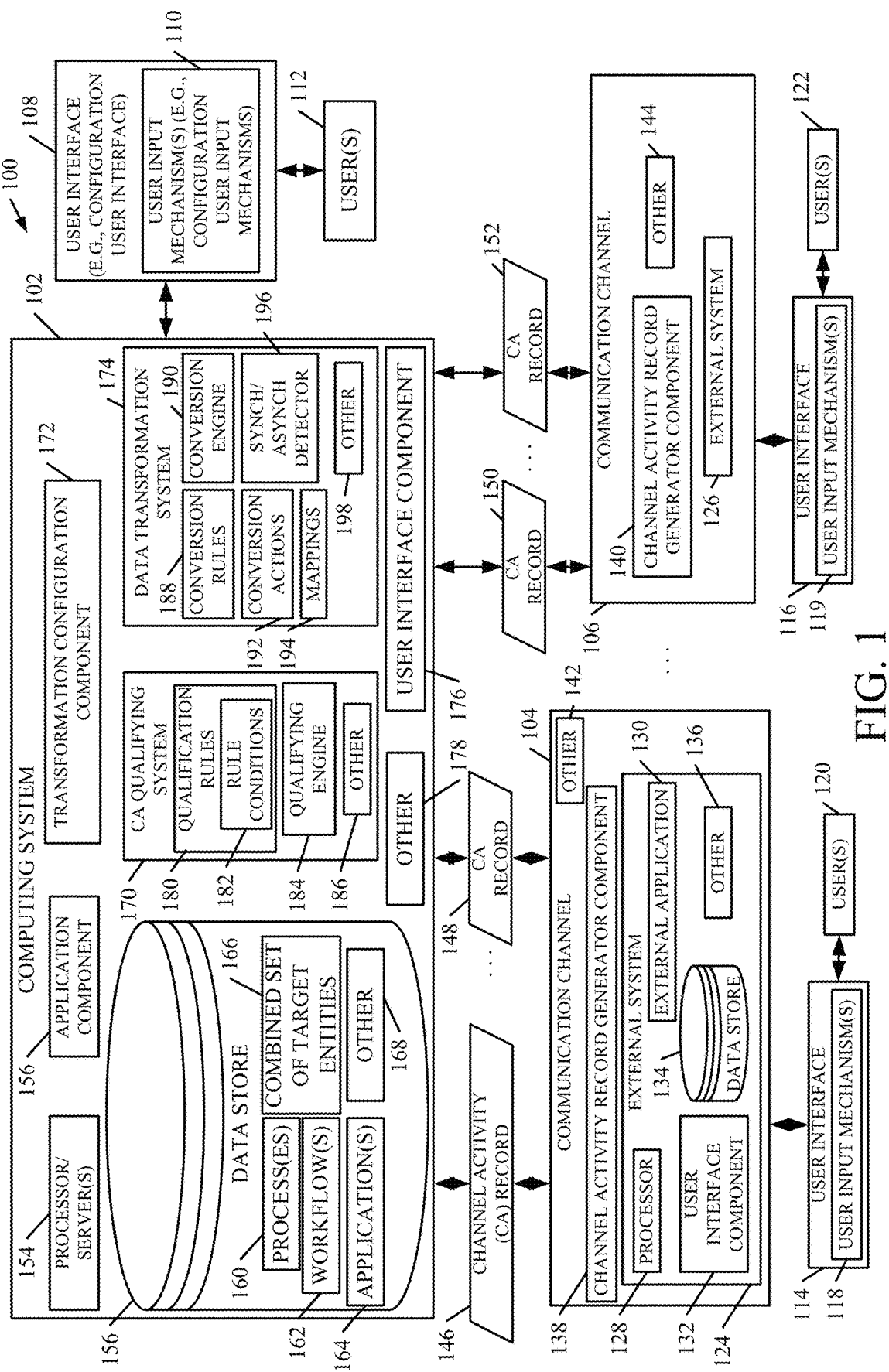
FIG. 1 is a block diagram of one example of a data transformation architecture.

FIG. 1 is a block diagram of one example of a data transformation architecture 100. Architecture 100 illustratively includes computing system 102 that is shown receiving information from a plurality of different communication channels 104-106. It is also shown generating user interfaces (e.g., user interface displays) 108, with user input mechanisms 110 for interaction by one or more users 112. Communication channels 104-106 are also shown generating user interfaces (e.g., user interface displays) 114-116, both of which have a set of user input mechanisms 118-119 for interaction by external users 120-122. User 108 may, for instance, be an employee of an organization using system 102. Users 120-122 may, for instance, be users of external systems that are external to system 102, as is described below.

Computing system 102 illustratively includes a processor or a set of processors or servers 154, application component 156, data store 158 (which, itself, can include a set of processes 160, workflows 162, applications 164, a combined set of target entities 166, and it can include other items 168), channel activity (CA) qualifying system 170, transformation configuration component 172, data transformation system 174, user interface component 176, and it can include other items 178. CA qualifying system 170, itself, illustratively includes a set of qualification rules 180 that have rule conditions 182. System 170 can include a qualifying engine 184, and other items 186. Data transformation system 174 can illustratively include a set of conversion rules 188 (or each qualification rule 180 can include the qualifying rule conditions 182 and the conversion rules 192), a conversion engine 190, conversion actions 192, conversion mappings 194, sync/async detector 196, and it can include other items 198.

Each of the communication channels 104-106 can include an external system 124-126 that users 120-122, respectively, can interact with and control using user input mechanisms 118-119. Communication channels 104-106 can also include channel activity record generator component 138-140, and can include other items 142-144.

In the example shown in FIG. 1, external system 124 illustratively includes a processor 128, an external application 130, user interface component 132, data store 134, and it can include other items 136. These items, or different ones, can also be found in external system 126. Users 120-122 interact with external systems 124-126. These interactions can be referred to as activities. By way of example, where communication channel 104 is a social network, and external system 124 is a social network system, then processor 128 runs external applications 130 (which can comprise one or more social network applications) that allow user 120 to interact with user input mechanisms 118 in order to post messages on the social network, to comment on other posts on the social network, to provide other inputs (such as "liking" items on the social network, etc.). In another example, where communication channel 104 is a portal into computing system 102, then external system 124 can be an external application (such as one that implements a website or other application) that generates a form with user input mechanisms 118 that can be used by user 120 to provide information to computing system 102 through the portal. Of course, the communication channels 104-106 can use electronic mail applications, various different websites, or a wide variety of other communication channels. In any case, and continuing with the discussion of communication channel 104, user 120 illustratively interacts with the external system 124.

Channel activity generator component 130 illustratively generates channel activity records 146-148, that represent the activities of user 120 (e.g., the interactions of user 120 with external system 124). FIG. 1 also shows that channel activity generator 140 in communication channel 106 illustratively generates channel activity records 150-152 that are representative of interactions of user 122 with external system 126.

Before describing operation of architecture 100 in transforming CA records 146-152 into target entities 166 in more detail, a brief overview is first provided. Also, in one example, as mentioned above, the qualification rule conditions 182 and conversion rules 188 can be part of a single rule, so that when conditions are met so the rule fires, the rule also specifies the conversion actions 192 that are to be taken. The present discussion proceeds with respect to the qualifying rule conditions 182 and conversion rules 188 being in separate rules, but it will be appreciated that they can be part of the same rule as well.

Transformation configuration component 172 illustratively generates user interfaces 108 with user input mechanism 110 so that user 112 can provide configuration information indicating when CA qualifying system 170 should determine that a channel activity record should have a corresponding target entity 166 created for it. It also can be used to receive configuration inputs configuring conversion rules 188, conversion actions 192, mappings 194 and other items in data transformation system 174, in order to identify the particular data transformation that is to be performed.

Processors or servers 154 illustratively use application component 156 to run applications 164. Applications 164 can operate on entities 166, and can be used to perform processes 160, workflows 162, etc. CA qualifying system 170 illustratively receives channel activity records (such as channel activity record 146) and identifies the content of those records to determine whether the received record illustratively meets rule conditions 182 of any qualification rules 180. If qualifying engine 184 determines that the channel activity record 146 does meet rule conditions 182 of one or more qualification rules 180, then this means that the channel activity record 146 is to be transformed into one or more target entities 166.

Therefore, conversion engine 190 accesses mapping 194 to determine the particular target entity (or entities) 166 that are to be created from the CA record 146. It also accesses conversion rules 188 to determine which conversion actions 192 are to be taken in order to transform the channel activity record 146 into the one or more target entities 166. It also determines whether this transformation is to be performed synchronously, or asynchronously, with the external system 124. Conversion engine 190 then performs the transformation.

Figure 2:
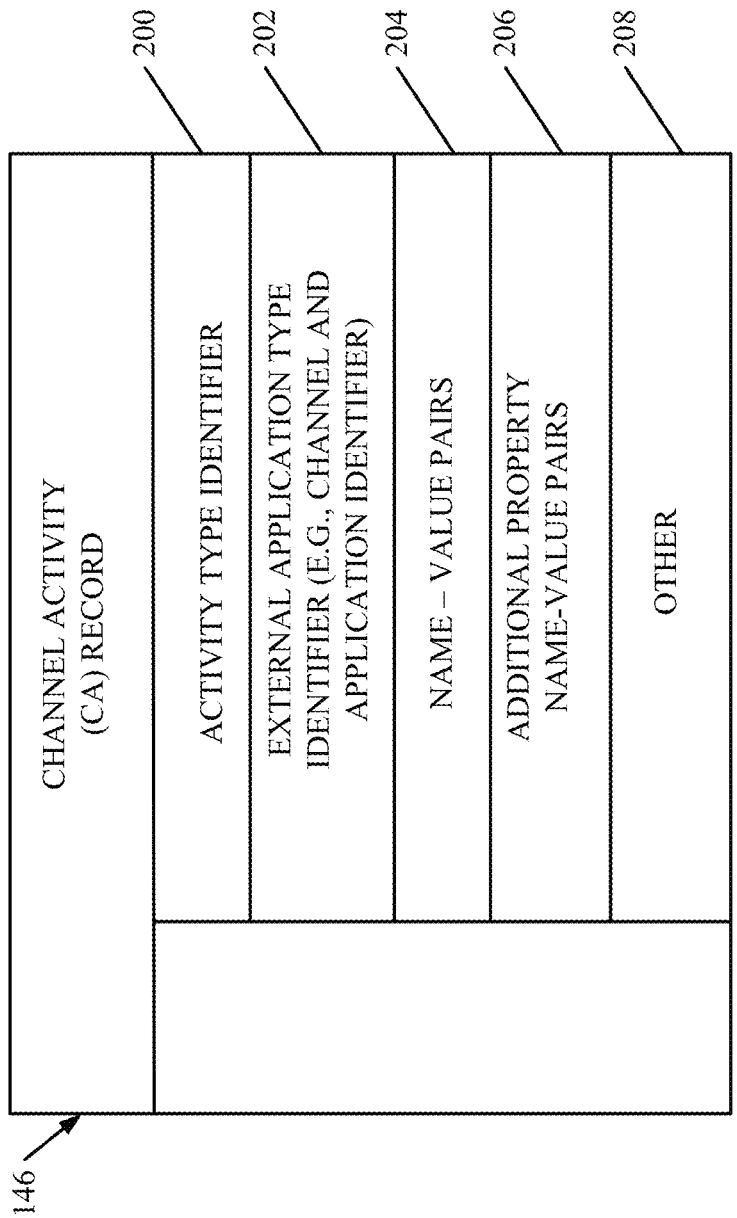
FIG. 2 is a block diagram of one example of a channel activity record.

FIG. 2 is a block diagram of one example of a channel activity record. In the example shown in FIG. 2, the channel activity record depicted is channel activity record 146. It will be appreciated, however, that the channel activity record shown in FIG. 2 could represent other channel activity records as well.

Record 146 illustratively includes an activity type identifier 200. Activity type identifier 200 illustratively identifies the type of activity that is represented by channel activity record 146. For instance, if the user interaction that is represented by channel activity record 146 is that the user posted a comment on a social network site, then activity type identifier 200 would indicate this. On the other hand, if the user interaction was that the user entered information through a portal into computing system 102, then activity type identifier 200 would indicate this.

Record 146 can also illustratively include an external application type identifier 202. Identifier 202 can, itself, include a channel identifier that identifies the type of communication channel from which the activity was captured, along with an application identifier identifying the application type through which the activity was captured. For instance, if the communication channel is a social network, then identifier 202 may indicate this. If the communication channel is an email channel, identifier 202 may identify this as well. It may also identify the particular type of external application implemented in the corresponding communication channel.

Record 146 may also illustratively include a set of attributes or properties of the particular channel activity. For instance, if the channel activity is an activity on a social network, then the properties or attributes might include a title and description. Each social network channel may also include different attributes or properties, as it sees fit. One might include a tag name value while another might include a "Liked by" name value pair. The different social channels have the flexibility to send different properties or attributes, at runtime and as they see fit for their particular application, even for the same channel activity.

The present discussion will proceed with respect to the properties or attributes being in the form of name-value pairs 204. This is an example only and the schema needed for the properties or attributes can be quite minimal, and the system still functions properly. For the sake of the present description, the set of name-value pairs 204 identify the particular nature of the activity represented by record 146. These can include a wide variety of different types of information. For instance, if the activity is a post on a social network site, the name-value pairs may indicate whether the post mentioned a particular product of the organization that is using computing system 100. They may also include a wide variety of other information, such as whether the sentiment of the post was positive, neutral, or negative. Further, they may indicate something about the user that made the post. By way of example, the name-value pairs may include a unique user identifier or an influence score that represents the user's influence in the particular domain in which the post was made. Of course, these are examples only and a wide variety of other examples of name-value pairs could be used as well.

In addition, record 146 can include a set of additional (or custom properties or name-value pairs) 206. As is discussed below with respect to FIG. 3, user 112 can use transformation configuration component 172 to specify the particular types of information that the user wishes to obtain from a given channel activity record and have transformed into a corresponding target entity 166. For instance, the channel activity record may provide a whole host of different information, but user 112 may only want a subset of that information considered in determining whether an entity is to be generated, and in generating one or more target entities for that activity. Thus, user 112 can illustratively provide configuration inputs to indicate which additional property name-value pairs 206 are to be obtained from the channel activity record 146, or which are to be considered in qualifying the record 146 and in transforming it into one or more target entities. Of course, channel activity record 146 can include other items 208 as well.

Figure 3:
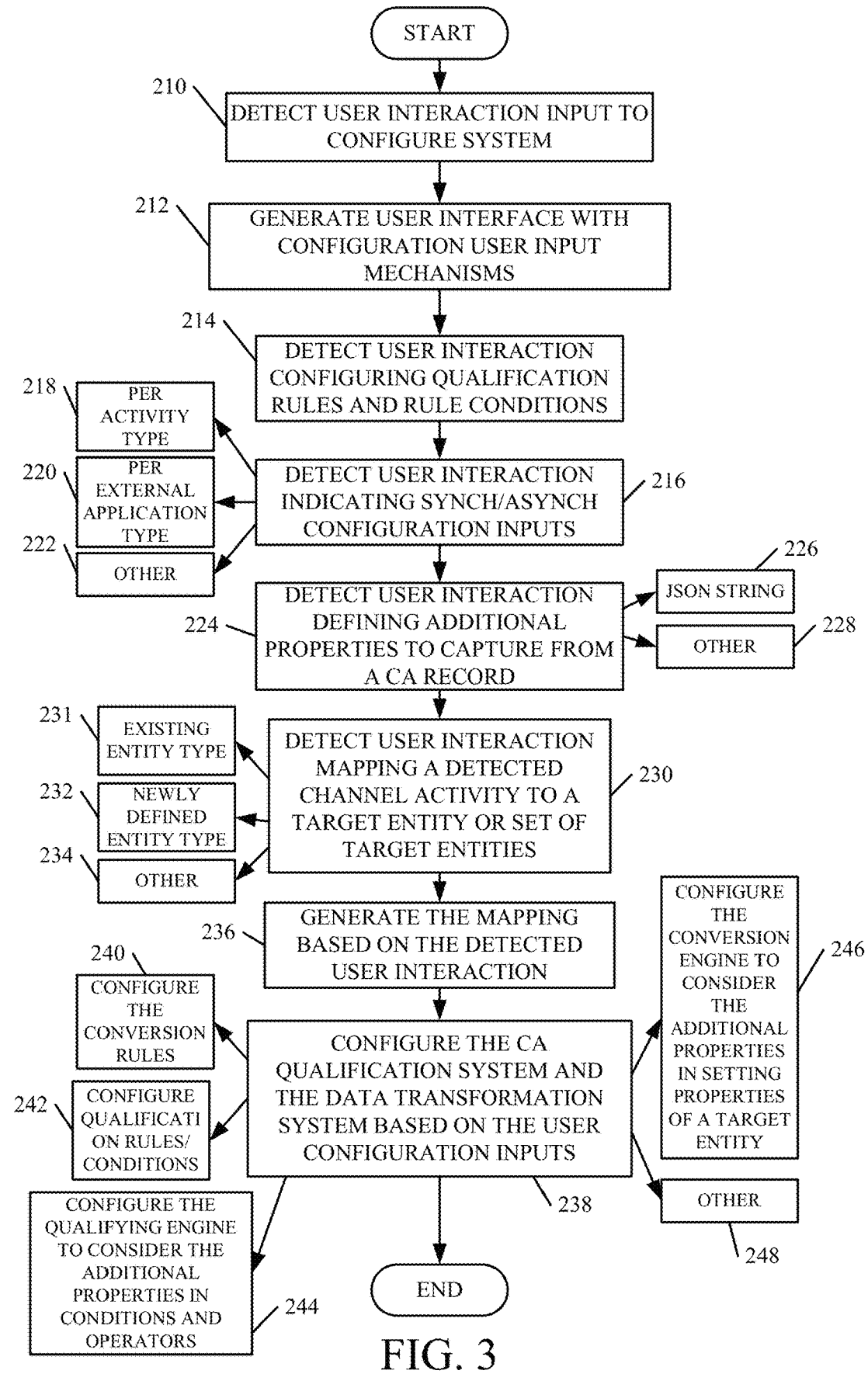
FIG. 3 is a flow diagram illustrating one example of the operation of the architecture shown in FIG. 1 receiving user configuration inputs and in configuring a qualifying system and data transformation system.

FIG. 3 is a flow diagram illustrating one example of the operation of transformation configuration component 172, in allowing user 112 to interact with computing system 102 in order to configure CA qualifying system 170 and data transformation system 174. Computing system 102 first detects a user interaction input indicating that the user 112 wishes to configure one or both of systems 170 and 174. This is indicated by block 210 in FIG. 3. Transfiguration component 172 then generates a user interface (such as a user interface display) with configuration user input mechanisms that can be actuated by user 112 in order to provide configuration inputs. This is indicated by block 212.

As an example, a user can interact with the configuration user input mechanisms to define a group of properties (e.g., a property bag) and property items that contain additional information in a payload that an external application can deliver to the system. The property bag and items can be used to parse the payload received from the external application to obtain desired information from the payload. The desired information can then be used in generating the corresponding CA record 146. Further, the user can interact with the configuration user input mechanisms to associate the property bag and property items with the qualifying rule conditions 182, and the conversion rules 188 (or with both the qualification and transformation parts of a rule, when they are in a single rule).

In one example, the configuration user input mechanisms can be actuated to configure the qualification rules 180. The configuration inputs can be to add, delete or modify rules 180 or conditions 182. Component 172 then detects user interactions with the user input mechanisms indicating qualification rules and rule conditions that are configured by user 112. This is indicated by block 214. For instance, user 112 may provide qualification rules 180 and rule conditions 182 that are to be used by qualifying engine 184 in determining whether a channel activity record 146 is even to have a target entity created for it at all. The rule conditions 182 can be conditions that are to be met by a channel activity record 146 in order for the record 146 to qualify (e.g., in order for it to have a target entity created for it). By way of example, the rule conditions 182 may indicate that a target entity is to be created for a channel activity record if it represents an activity of the social network post type, but only if the post references one of a plurality of listed products, and only if the sentiment of the post is positive or negative. As an example, it may be that an organization using computing system 102 does not need to create a record or perform any actions if an external user makes a neutral post about one of its products, or if the post is positive. However, it may be that the organization may wish to contact the user if the user is having trouble with a product, such as if the user posts a negative comment about the product on a social network application. In that case, the organization may wish to capture that user activity in an entity so the organization can follow up with the external user.

In another example, if a user is ordering a certain number of products from the organization through an order form on a portal, it may be that a certain target entity is to be created if the user orders a certain quantity of that product. Therefore, the rule conditions may be that if the activity is an ordering activity and if the quantity value on the order form exceeds 100, then a specific target entity is to be created that indicates to the organization that a user has just placed a large order.

Of course, these are examples only, and a wide variety of qualification rules 180 and corresponding rule conditions 182 can be entered by the user. Transformation configuration component 172 receives these inputs as indicated at block 214.

In one example, user 112 can also specify whether the particular transformation is to be performed synchronously or asynchronously with the given external system (e.g., external system 124) from which the channel activity record was captured. This is indicated by block 216. The synchronous or asynchronous nature of the data transformation can be specified in a wide variety of ways. For instance, user 112 can provide an input specifying it on a per-activity type basis 218, on a per-external application basis 220, or in other ways 222.

Transformation configuration component 172 also detects user interactions with configuration user input mechanisms that define any additional properties that data transformation system 174 is to capture from the channel activity record 146, in transforming the record 146 into one or more target entities. This is indicated by block 224. These additional properties can be represented as a JSON string 226, or in a wide variety of other ways 228.

Component 172 also detects user interactions with configuration user input mechanisms 110 that indicate a user configuring mappings 194 that map a detected channel activity to a target entity or set of target entities. This is indicated by block 230 in FIG. 3. It should be noted that the user 112 can map a given channel activity to a preexisting entity in computing system 102. This is indicated by block 232. Alternatively, the user can indicate that the user wishes to map the given activity to a new entity type. In that case, component 172 illustratively walks the user through a user experience that allows user 112 to define the new entity. Component 172 then maps the channel activity to the new entity. This is indicated by block 232. Configuring the mappings can be performed in other ways as well, and this is indicated by block 234.

Once component 172 receives the mapping inputs, it generates or otherwise configures the mappings 194 based on the detected user configuration inputs. This is indicated by block 236.

Transformation configuration component 172 then configures CA qualifying system 170 and data transformation system 174 based on the user configuration inputs. This is indicated by block 238. By way of example, it can illustratively generate new conversion rules 188 or modify existing conversion rules 188 which specify the particular conversion actions 192 that are to be taken during the data transformation process. This is indicated by block 240. It can also configure the qualifying engine 184 to consider any additional properties specified by the user 112. This is indicated by block 242. In addition, it can configure the qualifying engine 184 to consider the additional properties in the conditions 182 and operators set out in qualification rules 180. This is indicated by block 244. It can also configure the conversion engine 190 to consider any additional properties entered by the user, when engine 190 sets properties of a target entity or set of target entities during the transformation process. This is indicated by block 246. It can perform other configuration steps as well, and this is indicated by block 248.

Figure 4A:
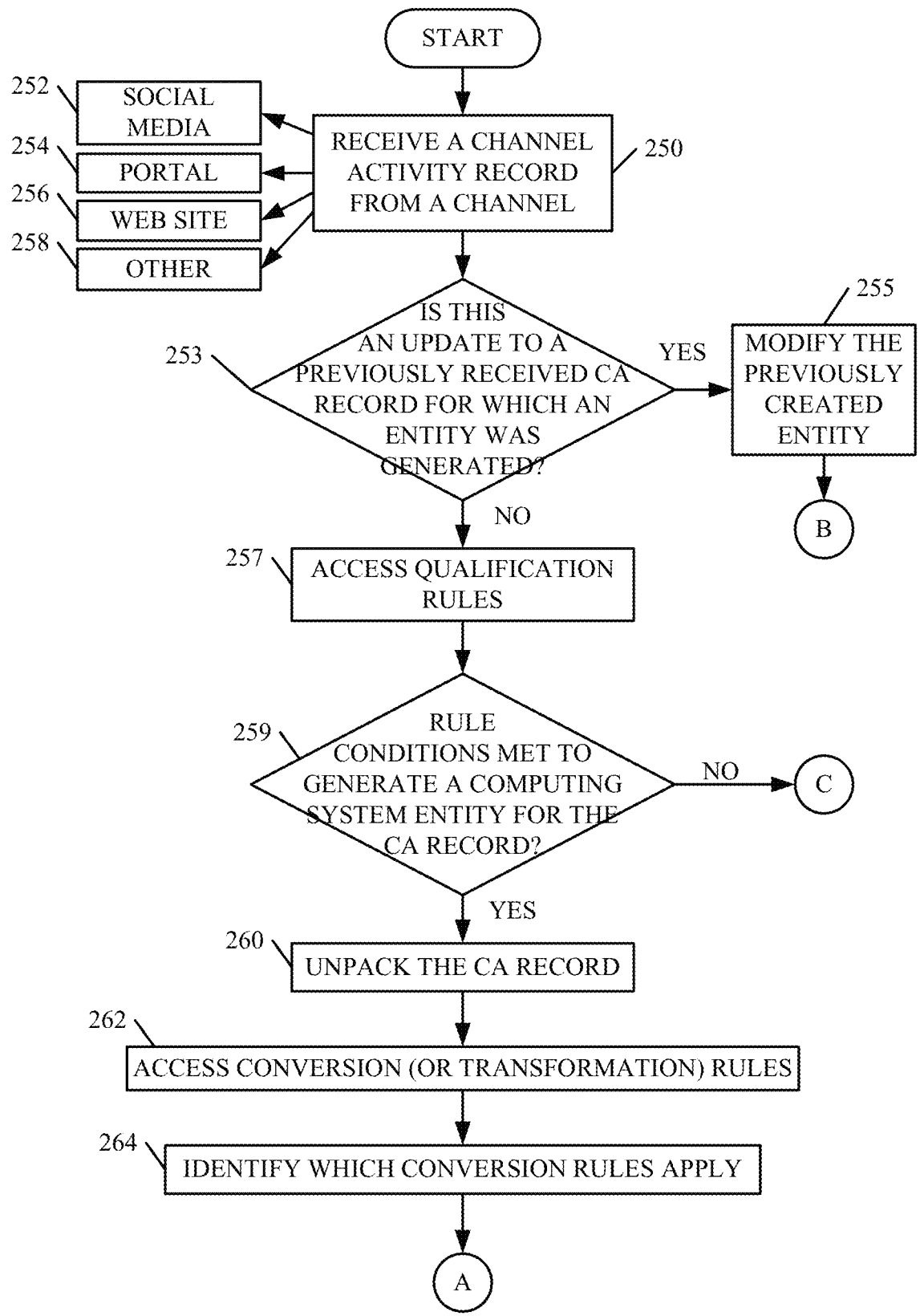
FIGS. 4A and 4B (collectively referred to herein as FIG. 4) show a flow diagram illustrating one example of the operation of a qualifying system and data transformation system shown in the architecture of FIG. 1.
Figure 4B:
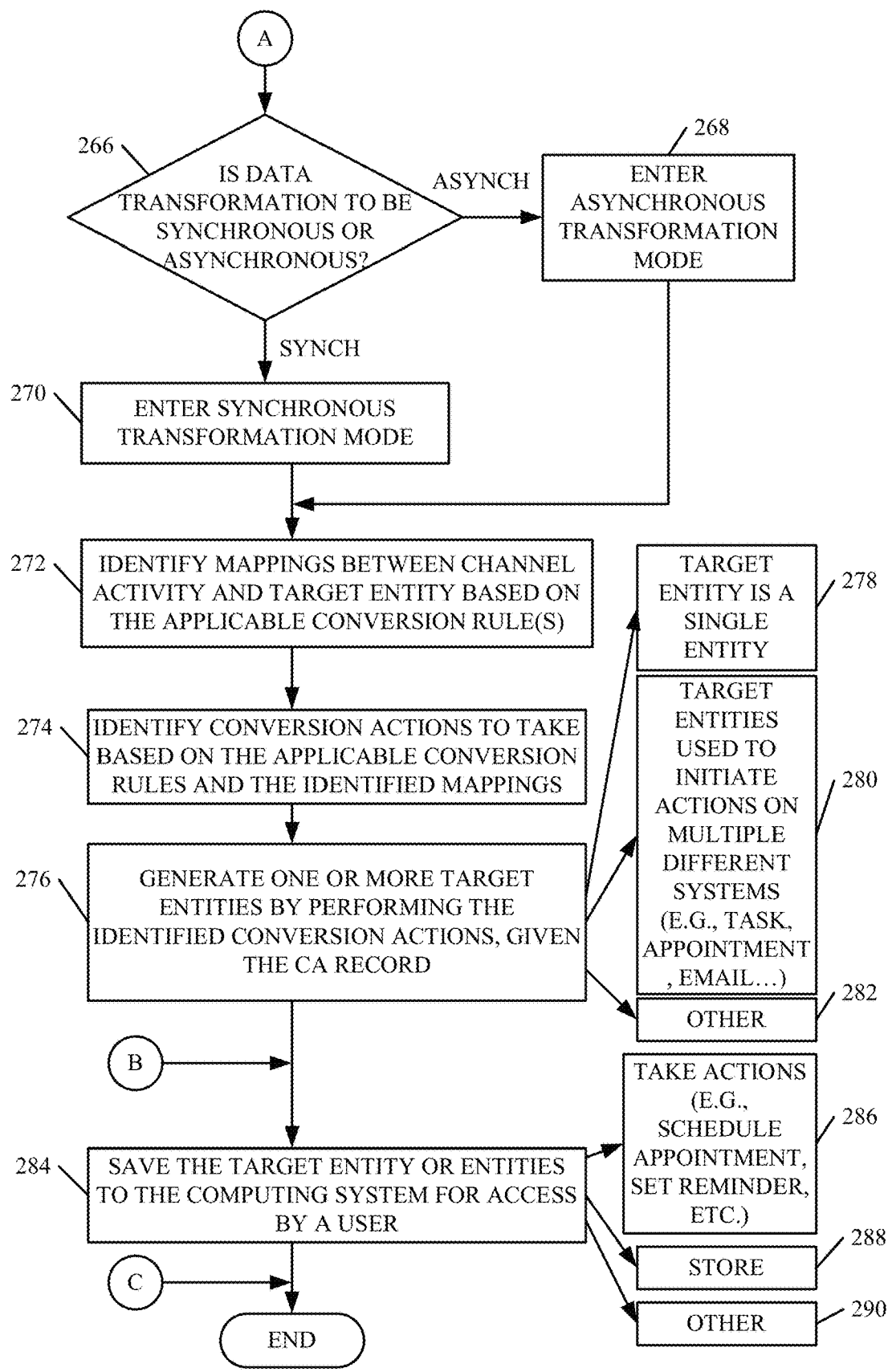

FIGS. 4A and 4B (collectively referred to herein as FIG. 4) illustrate one example of the operation of architecture 100, during runtime, when a channel activity record is received and when one or more target entities 166 are generated based upon that channel activity record.

CA qualifying system 170 first receives a channel activity record (e.g., record 146) from a communication channel 104-106. This is indicated by block 250 in FIG. 4. As examples, the communication channels can include social media channels 252, web portals 254, other website channels 256, or a wide variety of other channels 258.

CA qualifying system 170 then first determines whether the channel activity record 146 is an update to a previously received channel activity record for which an entity was generated. This is indicated by block 253. For instance, it may be that user 120 interacted with system 124 through a social network post. This activity may have been captured by a channel activity record and provided to system 102, where one or more target entities 166 were created based on that activity. User 120 may then go back and modify the post, update the post, or otherwise change it. In that case, qualifying system 184 in system 170 detects that this activity is a modification to a previous activity for which one or more target entities 166 were created. It then retrieves the previously-created target entity or entities and modifies them based upon the new channel activity record that was received. This is indicated by block 255.

However, if, at block 253, it is determined that no previous target entity was created for a related channel activity, then qualifying engine 184 accesses qualification rules 180. This is indicated by block 257. It compares the information in the received channel activity record 146 to the rule conditions 182 for the corresponding rules 180, to determine whether the conditions are met for any of the qualification rules 180. This is indicated by block 259. If not, then no target entity 166 is created from the activity record. However, if the conditions are met for one or more rules, the qualifying engine 184 unpacks the channel activity record 146 to obtain all of the information therein. This is indicated by block 260.

Conversion engine 190 then accesses the conversion rules 188 to identify, based upon the contents of the channel activity record 146 that was just unpacked, which conversion rules apply to this channel activity record 146. This is indicated by blocks 262 and 264 in FIG. 4. As one example, synchronous or asynchronous operation can be enabled. In such an example, synchronous/asynchronous detector 196 determines whether the data transformation is to be performed synchronously or asynchronously with respect to external system 124, and conversion engine 190 begins operating in the appropriate mode. This is indicated by blocks 266, 268 and 270.

Conversion engine 190 then identifies mappings 194 between the channel activity represented by the channel activity record 146 and one or more target entities. This can be done in a variety of different ways. For instance, the conversion rules 188 may indicate that, for this particular activity type, certain mappings are to be accessed. The mappings indicate a mapping between the values in the channel activity record, and the target entity or entities that are to be created. In order to create the target entity (or entities), conversion engine 190 also illustratively performs a set of conversion actions 192 that generate the target entity or target entities from the information in the channel activity record. Identifying the mappings and identifying conversion actions are indicated by blocks 272 and 274 in FIG. 4.

In another example, engine 190 may directly access the mappings 194 based on the information in the channel activity record. The mappings 194 may identify the particular target entity or entities 166 that are to be generated for this particular CA record 146. Engine 190 then identifies rules 188 that specify actions 192 to take in performing this transformation.

Once conversion engine 190 identifies all of this information, it generates one or more target entities 166, given the channel activity record 146, by performing the identified conversion actions 192 and by copying information from the channel activity record 146 and placing it in the proper place in the one or more target entities 166. This is indicated by block 276. Transformations can be performed as well.

It will be noted that the transformation can be used to generate one or more target entities in a wide variety of different ways. For instance, the target entity 166 may be a single entity that represents the detected channel activity. By way of example, if an external user 120 provides feedback through a form on a portal communication channel, a single feedback entity may be generated from that channel activity. However, multiple target entities may also be created. For instance, if the user 120 provides feedback and indicates a negative sentiment, then the system may generate not only the feedback target entity that represents the feedback, but it may also generate a task entity that indicates a task that is assigned to an employee (e.g., user 112) of the organization to schedule an appointment with that external user 120, or to call the user 120, or to otherwise follow up with the user 120. Generating a single entity is indicated by block 278, and generating multiple different entities, in multiple different systems, is indicated by block 280. By way of example, the single entity may be simply entered in the data store 156 of computing system 102. However, the task entity or appointment entity may be used to enter an appointment in a calendaring system or other scheduling system of computing system 102.

Generating a single entity or more entities by performing the identified conversion actions can be performed in other ways as well. This is indicated by block 282.

Conversion engine 190 then saves the target entity or entities 166 to computing system 102 (such as in data store 156). This is indicated by block 284. It will also be noted that, where the target entities 166 represent certain actions to be taken, computing system 102 can automatically take actions based on those entities as well. For instance, the scheduling system in computing system 102 can schedule an appointment if one of the target entities 166 is an appointment entity. The reminder system can generate a reminder, if one of the target entities is a reminder entity, etc. Taking actions based on the generated entities is indicated by block 286. Of course, the entities can simply be stored for later access, as indicated by block 288, or the entities can be saved in other ways 290.

It can thus be seen that the present system improves the extensibility of computing system 102. By allowing user 112 to provide configuration inputs, the qualifying system 170 in data transformation system 174 can be configured to receive substantially any input from substantially any channel activity record, and create substantially any type of entity within computing system 102. All of this is highly configurable which greatly extends usefulness of computing system 102. Similarly, and because of this extensibility, system 102 can be easily adapted to capture information from future activities of different types. Thus, system 102 is highly configurable so that it can adapt to future activities which have not been developed yet.

Transformation configuration component 172 can also be used by a user 112 to specify or configure rules or conditions under which one or more target entities are to be generated. Component 172 illustratively generates user interface displays with user input mechanisms that can be easily actuated by user 112 to configure the rules and conditions. Thus, the user need not necessarily have any detailed knowledge about the operation of system 102, in order to have target entities generated for captured channel activities. Instead, the user need simply specify, through a suitable user interface, what conditions are to be met, for which types of activities, and what type of target entity is to be generated under those conditions.

Similarly, because conversion engine 190 can create multiple target entities 166 from a single channel activity, the functionality of system 102 is greatly improved. Instead of simply creating a single entity that reflects the channel activity, engine 190 can create multiple entities that not only reflect the activity, but represent tasks that are to be performed in response to the activity. Thus, because a single workflow can be used to generate multiple target entities 166 based on a single channel activity, this improves not only the efficiency of system 102, but can also improve its speed. That is, multiple workflows need not be performed in order to generate the multiple target entities. They can be generated automatically, using a single workflow, based on a single channel activity record.

In addition, user 112 need not author custom code in order to handle any new channel activities. User 112 need only specify the type of channel activity for which an entity is to be created, the conditions under which it is to be created, and the type of target entity 166 (or entities 166) that are to be created, and qualifying system 170 and data transformation system 174 automatically qualify incoming CA records to determine whether any target entities are to be created and, if so, performs the data transformation to create them. Further, because user 112 can identify conditions and rules under which a target entity 166 is to be created, this enables system 102 to handle much larger volumes of channel activities. By way of example, the number of social media posts can be extremely high. Therefore, the channel activity records created for such posts and provided by such external systems can be extremely high as well. However, by allowing user 112 to easily set up conditions under which target entities 166 are to be created from those posts, this allows system 102 to process a large volume of channel activities very quickly, because it determines at the outset, whether it needs to even generate a target entity from a given channel activity. Where most of the channel activities can be discarded at the outset, this can drastically improve the performance of system 102.

It is also contemplated herein that the qualification rules 180 can have not only the rule conditions 182, that specify when a rule applies to a channel activity, but rule actions as well. As discussed above, the actions can be conversion actions 192 that are used to create and update a CA record 146 in system 102. However, the actions can be other things as well. For instance, they can specify that a particular child workflow is to be launched in system 102. When the rule fires. They can also specify that an electronic mail (email) message is to be send when the rule fires. They can specific a variety of other actions as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interfaces have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
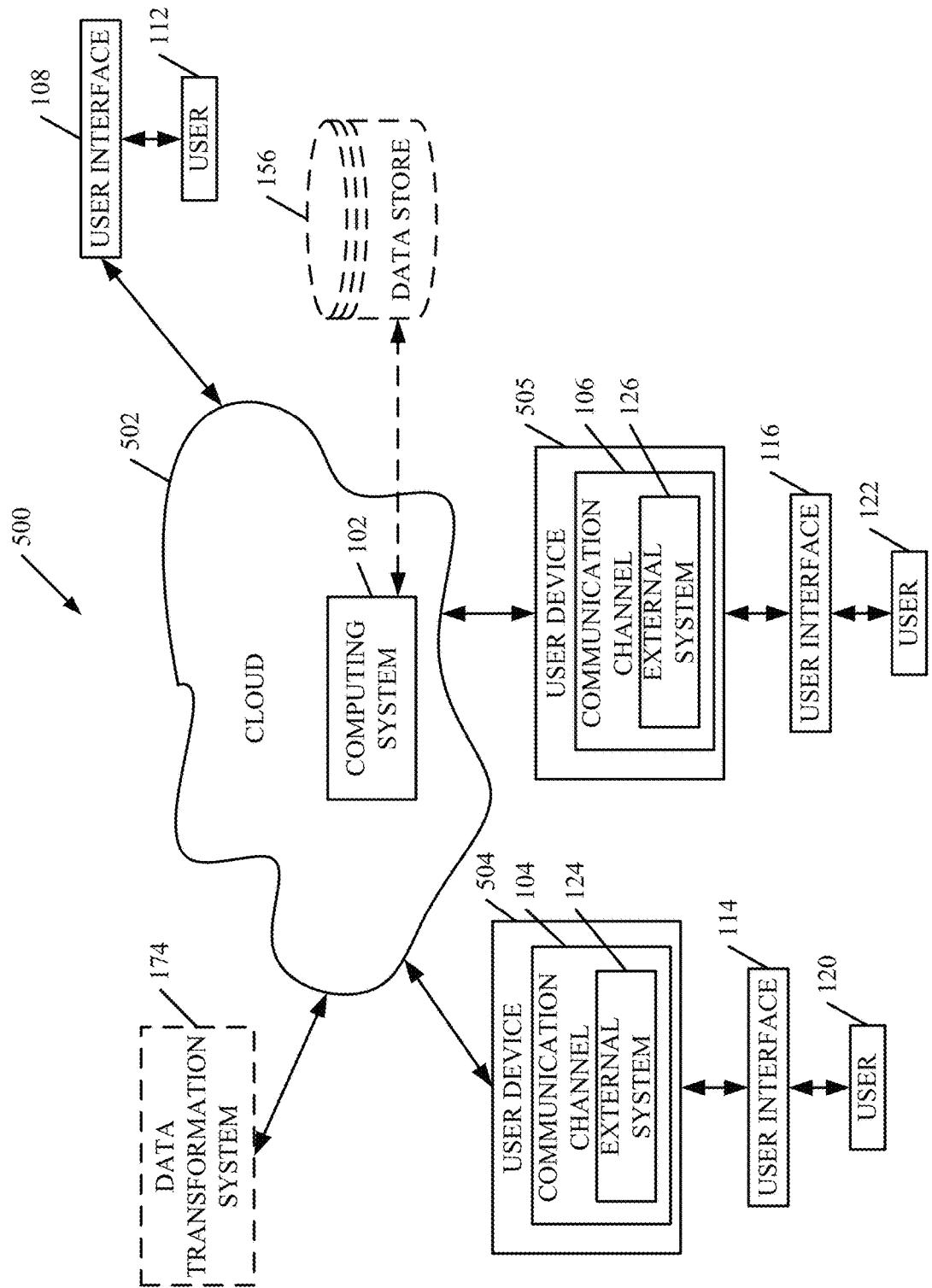
FIG. 5 is a block diagram illustrating one example of the architecture shown in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, users 120 and 122 use user devices 504 and 505 that include external systems 124 and 126 to access those systems through cloud 502.

FIG. 5 also depicts another example of a cloud architecture. FIG. 5 shows that it is also contemplated that some elements of computing system 102 can be disposed in cloud 502 while others are not. By way of example, data store 156 can be disposed outside of cloud 502, and accessed through cloud 502. In another example, data transformation system 174 can also be outside of cloud 502. Regardless of where they are located, they can be accessed directly by devices 504 and 505, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
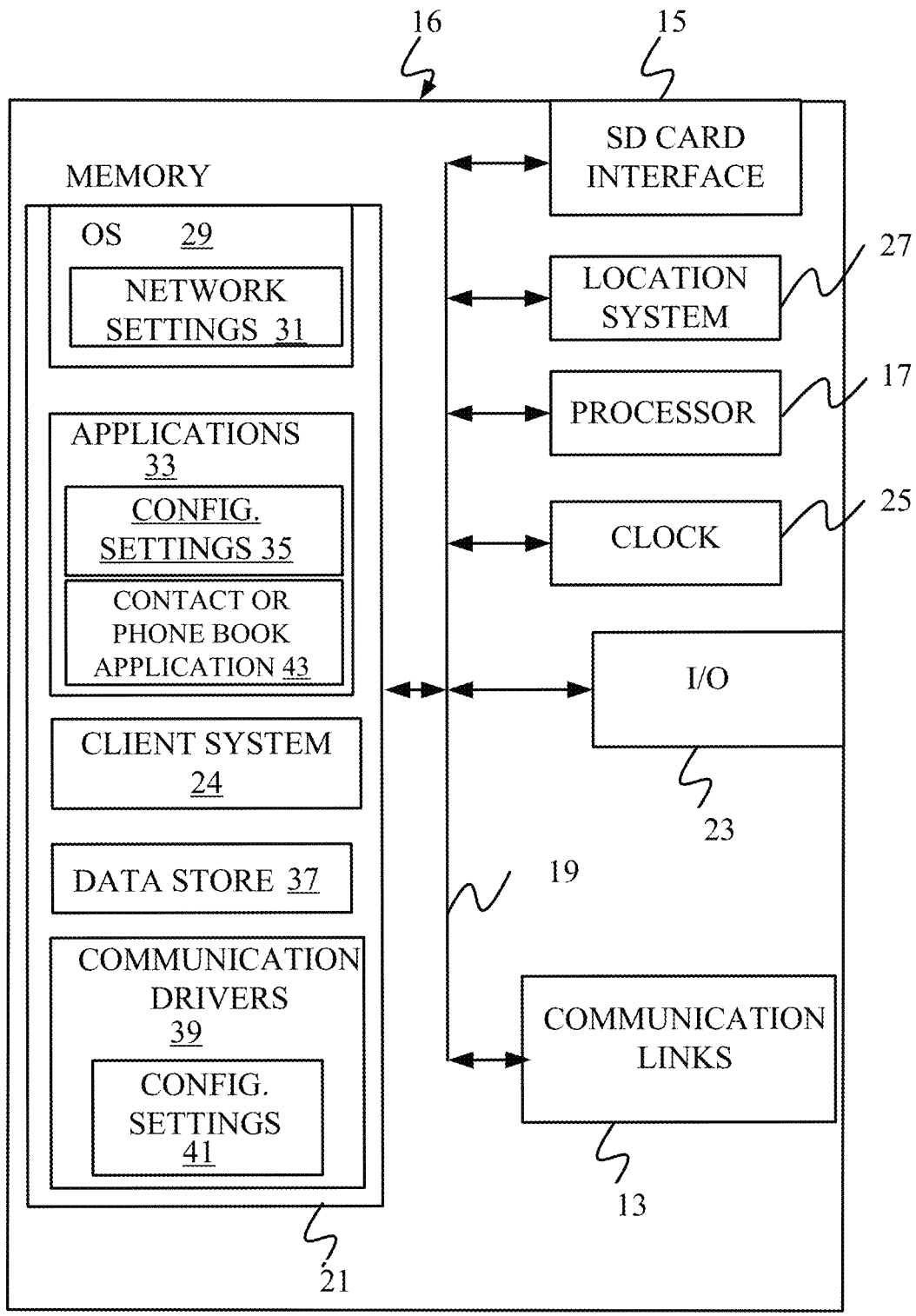
FIGS. 6-8 show examples of mobile devices that can be used in the architectures of the previous figures.
Figure 7:
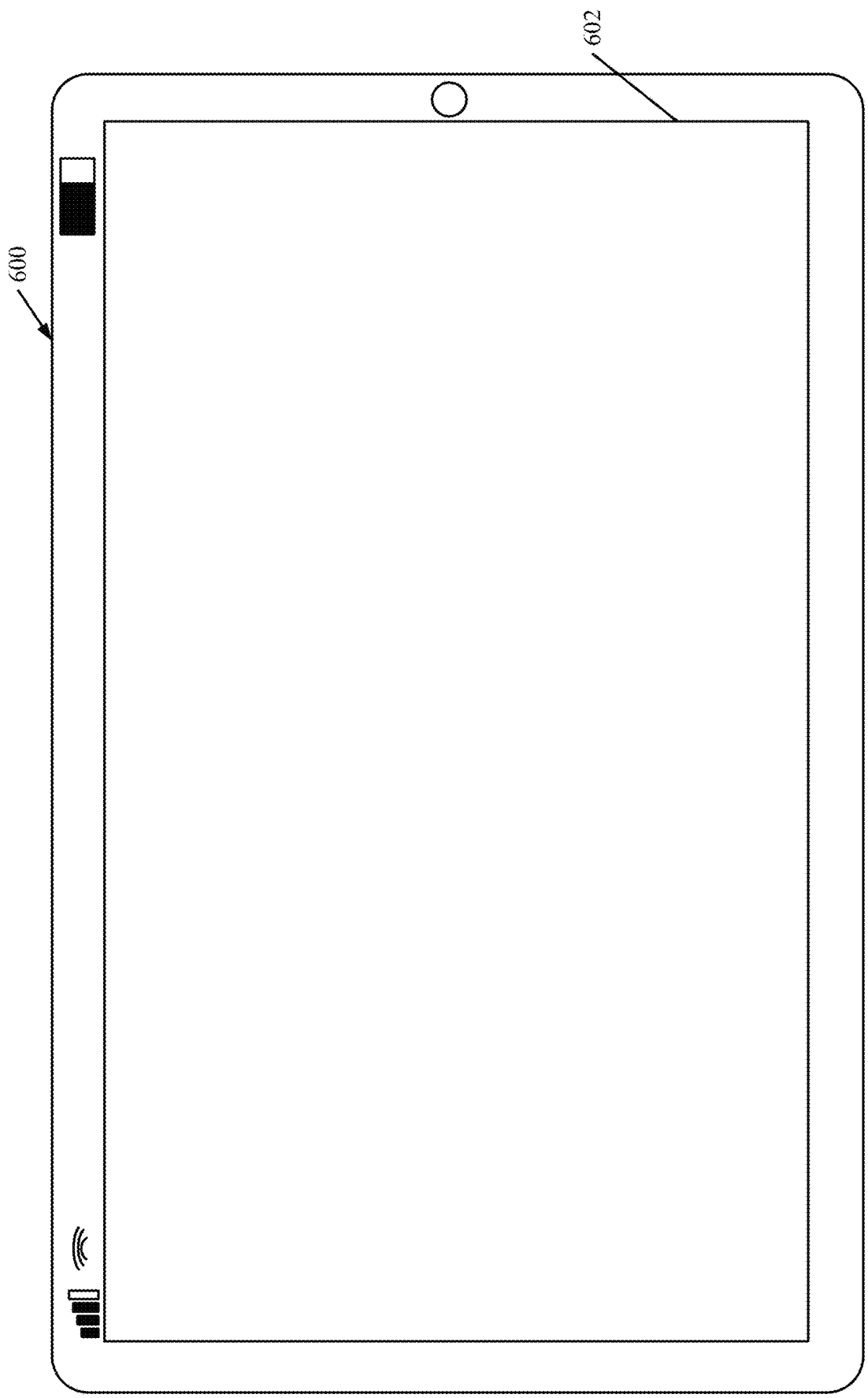
Figure 8:
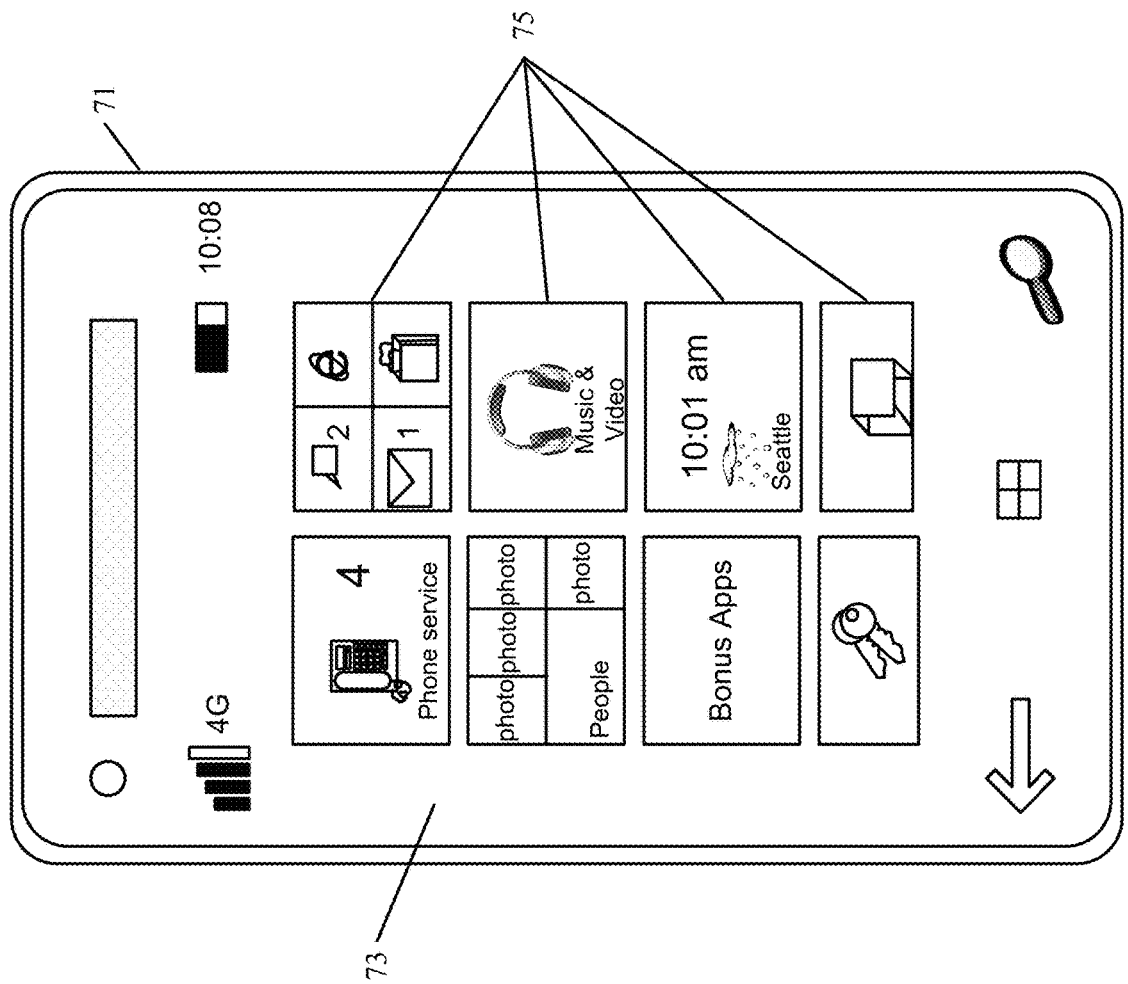

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 102 or external systems 124-126 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as WiFi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 154 or 128 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of system 102 or the external systems. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of device 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
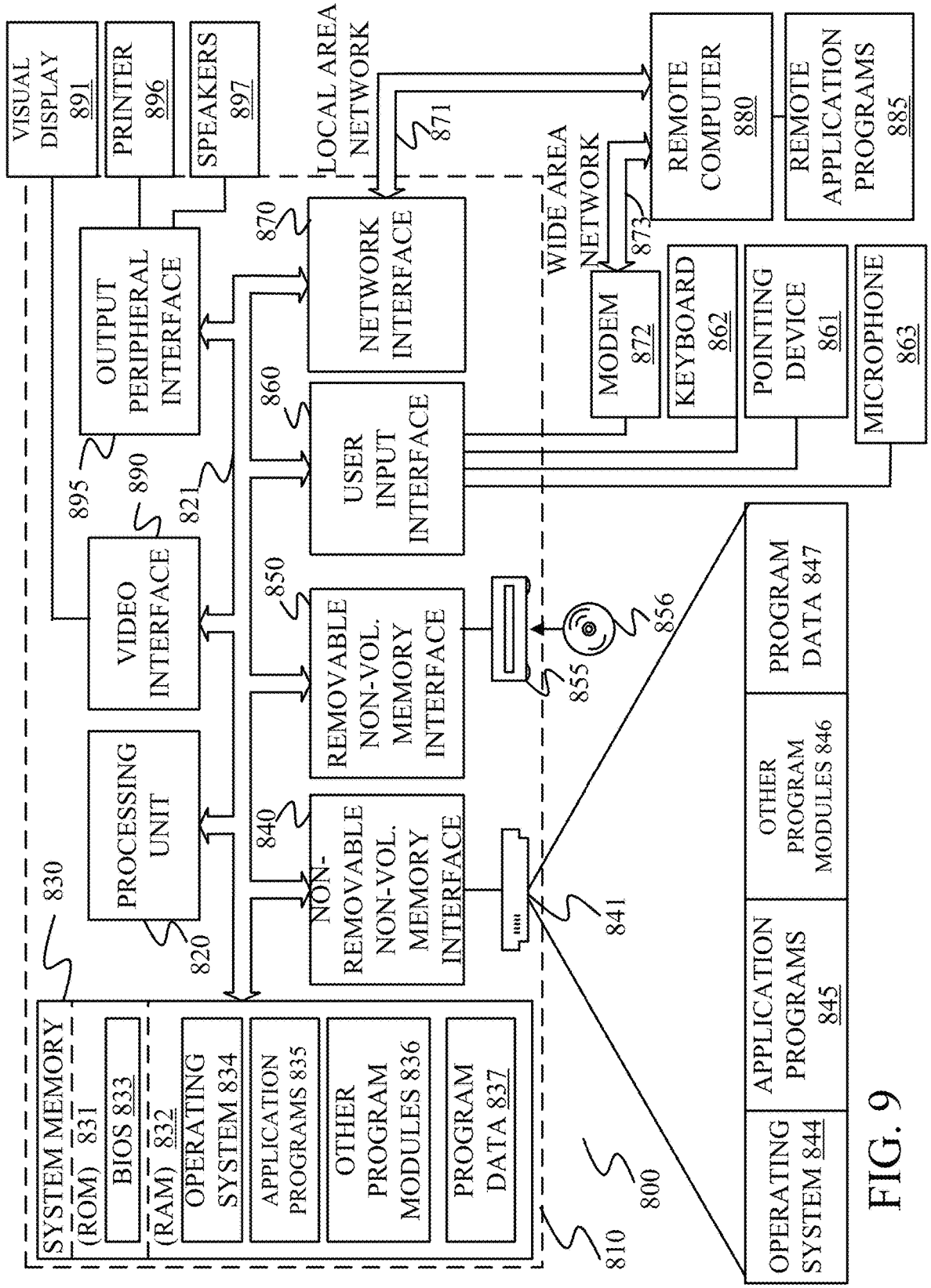
FIG. 9 is a block diagram of one example of a computing system that can be used in the architecture of the previous figures.

FIG. 9 is one embodiment of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors 154 or 128), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is s computing system, comprising:
a qualifying system that receives, over a first communication channel, a channel activity record that has values indicative of a sensed user interaction activity in any of a plurality of different external systems and determines that the channel activity record is to be transformed into a target entity in the computing system, to identify the channel activity record as a qualifying channel activity record;
a set of conversion rules that identify conversion actions to take to transform the qualifying channel activity record into the target entity;
a conversion engine that accesses the conversion rules and performs the conversion actions on the values in the qualifying channel activity record to transform the qualifying channel activity record into the target entity, and that stores the target entity for access in the computing system; and
a transformation configuration component that generates a configuration user interface with configuration user input mechanisms that detect user configuration inputs and that configure the qualifying system and the set of conversion rules based on the user configuration inputs.

Example 2 is the computing system of any or all previous examples wherein the qualifying system comprises:
a set of qualification rules, each having a set of rule conditions; and
a qualifying engine that identifies the channel activity record as a qualifying channel activity record by determining that the values in the qualifying channel activity record meet the rule conditions in any of the qualifying rules, and, if not, the qualifying engine determines that the channel activity record is not a qualifying channel activity record and is not to be transformed into a target entity.

Example 3 is the computing system of any or all previous examples wherein the transformation configuration component generates the configuration user interface with qualification configuration user input mechanisms that sense qualification configuration user inputs, the transformation configuration component modifying the qualifying rules and rule conditions based on the qualification configuration user inputs.

Example 4 is the computing system of any or all previous examples wherein the conversion rules indicate a set of values in the qualifying channel activity record that is to be transformed into the target entity.

Example 5 is the computing system of any or all previous examples wherein the transformation configuration component generates the configuration user interface with conversion configuration user input mechanisms that sense conversion configuration user inputs, the transformation configuration component modifying the conversion rules to transform a modified set of values in the qualifying channel activity record into the target entity, based on the conversion configuration user inputs.

Example 6 is the computing system of any or all previous examples and further comprising:
a set of mappings that indicate which given target entity is to be generated in the computing system from each qualified channel activity record.

Example 7 is the computing system of any or all previous examples wherein the transformation configuration component generates the configuration user interface with mapping configuration user input mechanisms that sense mapping configuration user inputs, the transformation configuration component modifying the mappings to transform the qualifying channel activity record into a different target entity, based on the mapping configuration user inputs.

Example 8 is the computing system of any or all previous examples wherein the transformation configuration component modifies the set of mappings to indicate that the qualifying channel activity record is to be transformed into a set of a plurality of target entities based on the mapping configuration inputs.

Example 9 is the computing system of any or all previous examples wherein the transformation configuration component generates the configuration user interface with the configuration user input mechanisms for user actuation to configure conditions under which a given channel activity record is identified as a given qualifying channel activity record.

Example 10 is the computing system of any or all previous examples wherein the conditions are indicative of a type of external system from which the channel activity record was received, a type of the communication channel and an interaction type represented by the channel activity record.

Example 11 is the computing system of any or all previous examples wherein the transformation configuration component generates the configuration user interface with the configuration user input mechanisms for user actuation to configure which target entities are to be generated in the computing system from each given qualifying channel activity record.

Example 12 is the computing system of any or all previous examples wherein the transformation configuration component generates the configuration user interface with the configuration user input mechanisms for user actuation to configure which values in each given qualifying channel activity record are to be transformed into one or more target entities.

Example 13 is the computing system of any or all previous examples wherein the transformation configuration component generates the configuration user interface with the configuration user input mechanisms for user actuation to configure whether the transformation of the qualifying channel activity record is synchronous or asynchronous with the external system from which it was received.

Example 14 is a computer implemented method, comprising:

generating a configuration interface with configuration user input mechanisms that sense user actuation indicative of user configuration inputs;

configuring qualification rules, with corresponding rule conditions, to indicate conditions under which a received channel activity record, received through any of a plurality of different communication channels and representing user interaction with an application, is a qualifying channel activity record, based on the user configuration inputs;

configuring a mappings indicative of a set of target entities, in a computer system, into which a given qualifying channel activity record is to be transformed, based on the user configuration inputs;

configuring conversion rules indicative of conversion actions to take in transforming the given qualifying channel activity record into the set of target entities in the computer system, based on the user configuration inputs;

after configuring the qualification rules, the mappings, and the conversion rules based on the configuration user inputs, receiving a channel activity record, identifying the channel activity record as a qualifying channel activity record based on the qualification rules, identifying the set of target entities that the qualifying channel activity record is to be transformed into based on the mappings, and transforming the qualifying channel activity record into the identified set of target entities in the computer system based on the conversion rules.

Example 15 is the computer implemented method of any or all previous examples wherein configuring the conversion rules comprises:

configuring the conversion rules to identify which values in the given qualifying channel activity record are to be transformed into the set of target entities.

Example 16 is the computer implemented method of any or all previous examples wherein configuring qualification rules comprises:

configuring the corresponding rule conditions to indicate whether the received channel activity record is a qualifying channel activity record based on a type of application the user interacted with, a type of the communication channel through which the received channel activity record was received, and an interaction type represented by the channel activity record.

Example 17 is the computer implemented method of any or all previous examples wherein configuring qualification rules comprises:

configuring the corresponding rule conditions to indicate whether the received channel activity record is a qualifying channel activity record based on a set of values in the channel activity record.

Example 18 is a computer implemented method, comprising:

receiving channel activity records at a computing system, the channel activity records being indicative of user interactions by external users with a plurality of different external applications, external to the computing system, the channel activity records being received at the computing system over a corresponding plurality of different communication channels;

accessing user configurable qualification rules to identify which of the plurality of different channel activity records are qualifying channel activity records; and for each given qualifying channel activity record, accessing a user configurable mapping to identify a set of target entities that the given qualifying channel activity record is to be transformed into;

accessing user configurable conversion rules indicative of values in the given qualifying channel activity record that are to be transformed into the set of target entities; and transforming the values in the given qualifying channel activity record into the set of target entities by performing conversion actions identified in the conversion rules.

Example 19 is the computer implemented method of any or all previous examples and further comprising:

displaying a user interface display with configuration user input mechanisms that receive user configuration inputs;

receiving the user configuration inputs; and configuring the qualification rules, the mapping, and the conversion rules, based on the user configuration inputs.

Example 20 is the computer implemented method of any or all previous examples wherein configuring the qualification rules comprises:

configuring the qualification rules so a given channel activity record is identified as a qualifying channel activity record based on an application type of the external application, a type of the communication channel, a type of user interaction by the external user, and based on a value in the channel activity record.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a transformation configuration component configured to:
generate a qualification rule having a rule condition that defines when channel activity records quality for creation of a target data task entity based on values in the channel activity records; and
generate a conversion rule, associated with the qualification rule, that defines a conversion action on the values in qualifying channel activity records;
a qualifying system configured to:
receive, over a communication channel from an external system that is external to the computing system, a channel activity record that has input values indicative of a sensed user interaction activity in the external system, the input values including an indication of an interaction type and based on a determination that the input values in the channel activity record meet the rule condition, determine that the channel activity record is a qualifying channel activity record; and a conversion engine configured to:
perform, based on the determination that the channel activity record is a qualifying channel activity record, the conversion action on the input values in the qualifying channel activity record to create the target data task entity; and store the target data task entity for access in the computing system, the target data task entity indicating one or more computing tasks in the computing system.

2. The computing system of claim 1 wherein
the qualification rule defines which values in a channel activity record are to be considered in qualifying the channel activity records as a qualifying channel activity record, and the conversion action maps values in the qualifying channel activity record to a set of target data task entities to be created for the qualifying channel activity record.

3. The computing system of claim 1, wherein the transformation configuration component is configured to generate a configuration user interface with a qualification rule configuration user input mechanism that senses a user input and generates the qualification rule and rule condition based on the qualification configuration user input.

4. The computing system of claim 1 wherein
the qualifying system is configured to receive channel activity records from a plurality of different external systems, and the conversion rule indicates values in the qualifying channel activity record to be used to create a particular set of properties on the target data task entity.

5. The computing system of claim 4 wherein the transformation configuration component is configured to generate a configuration user interface with a conversion rule configuration user input mechanism that senses a user input and generates the conversion rule to transform values in the qualifying channel activity record into the target data task entity, based on the conversion configuration user input.

6. The computing system of claim 5 and further comprising:
mappings that indicate which target data task entity is to be generated in the computing system from each qualified channel activity record.

7. The computing system of claim 6 wherein the transformation configuration component generates the configuration user interface with mapping configuration user input mechanism that senses a mapping configuration user input, the transformation configuration component modifying the mapping to transform the qualifying channel activity record into a different target data task entity, based on the mapping configuration user input.

8. The computing system of claim 7 wherein the transformation configuration component modifies the set of mappings to indicate that the qualifying channel activity record is to be transformed into a plurality of target data task entities based on the mapping configuration input.

9. The computing system of claim 1 wherein the condition is indicative of a type of external system from which the channel activity record was received and a type of the communication channel.

10. The computing system of claim 1 wherein the transformation configuration component generates a configuration user interface with a configuration user input mechanism for user actuation to configure which target data task entities are to be generated in the computing system from each qualifying channel activity record.

11. The computing system of claim 10 wherein the transformation configuration component generates the configuration user interface with the configuration user input mechanism for user actuation to configure which values in each qualifying channel activity record are to be transformed into target data task entities.

12. The computing system of claim 11 wherein the transformation configuration component generates the configuration user interface with the configuration user input mechanism for user actuation to configure whether the transformation of the qualifying channel activity record is synchronous or asynchronous with the external system from which it was received.

13. The computing system of claim 1, wherein the target data task entity is configured to cause an action.

14. A computer implemented method, comprising:
configuring qualification rules, with corresponding rule conditions that relate to activity type, to indicate conditions under which a received channel activity record, received through any of a plurality of different communication channels and representing user interaction with an application, is a qualifying channel activity record that triggers generation of a set of target data task entities in a computer system;

configuring mappings indicative of the set of target data task entities into which the given qualifying channel activity record is to be transformed;

configuring conversion rules indicative of conversion actions to take in transforming the given qualifying channel activity record into the set of target data task entities in the computer system;

after configuring the qualification rules, the mappings, and the conversion rules,
receiving a channel activity record,
identifying the channel activity record as a qualifying channel activity record based on the qualification rules,
identifying the set of target data entities that the qualifying charm activity record is to be transformed into based on the mappings, and
transforming the qualifying, channel activity record into the identified set of target data task entities in the computer system based on the conversion rules.

15. The computer implemented method of claim 14, and further comprising:
generating a configuration interface with configuration user input mechanisms that sense user actuation indicative of user configuration inputs; and
configuring, based on the user configuration inputs, the qualification rules, the mappings, and the conversion rules, wherein configuring the conversion rules comprises:
configuring the conversion rules, to identify which values in the given qualifying channel activity record are to be transformed into the set of target data task entities.

16. The computer implemented method of claim 14, and further comprising taking action based on the target data task entities.

17. A computer implemented method, comprising:
generating, a set of qualification rules, each qualification rule having a rule condition that defines when channel activity records qualify for creation of a target data task entity;

generating a conversion rule, associated with each qualification rule, that defines a conversion action on values in qualifying channel activity records to create the target data task entity for the associated qualification rule;
receiving channel activity records at a multi-user computing system, the channel activity records being indicative of user interactions by external users with a plurality of different external applications, external to the multi-user computing system, the channel activity records being received at the multi-user computing system over a corresponding plurality of different communication channels;
identifying a subset of the plurality of different channel activity records as qualifying channel activity records based on the set of qualification rules; and
for each identified qualifying channel activity record,
   accessing a mapping to identify a target task entity that the qualifying channel activity record is to be transformed into;
   accessing a corresponding one of the conversion rules indicative of values in the qualifying channel activity record that are to be transformed into the target task entity; and
   creating the target task entity based on values in the qualifying channel activity record by performing the conversion action identified in the corresponding conversion rule.

18. The computer implemented method of claim 17 and further comprising;
displaying a user interface display with configuration user input mechanism that receives a user configuration input;
receiving the user configuration input; and
configuring the qualification rules, the mapping, and the conversion rules, based on the user configuration inputs.

19. The computer implemented method of claim 18 wherein configuring the qualification rules comprises:
configuring the qualification rules so a channel activity record is identified as a qualifying channel activity record based on an application type of the external application, a type of the communication channel, a type of user interaction by the external user, and based on a value in the channel activity record.

* * * * *